US005689870A

United States Patent [19]

Robey

[11] Patent Number: 5,689,870

[45] Date of Patent: Nov. 25, 1997

[54] VALVE SPRING COMPRESSOR TOOL

[76] Inventor: Peter D. Robey, P.O. Box 87, Cedar Brook, N.J. 08018

[21] Appl. No.: 710,329

[22] Filed: Sep. 16, 1996

[51] Int. Cl.[6] .......... B23P 19/04

[52] U.S. Cl. .......... 29/217

[58] Field of Search .......... 29/215, 216, 217, 29/219, 220, 267; 254/10.5

[56] References Cited

U.S. PATENT DOCUMENTS

| | | | |
|---|---|---|---|
| 1,157,223 | 10/1915 | Holcomb . | |
| 1,370,397 | 3/1921 | Axelton | 29/220 |
| 1,468,526 | 9/1923 | Terroine . | |
| 4,567,634 | 2/1986 | Landry | 29/220 |
| 5,042,128 | 8/1991 | Barbour | 29/217 |
| 5,339,515 | 8/1994 | Brackett et al. | 29/705 |
| 5,349,732 | 9/1994 | Spence | 29/221 |

FOREIGN PATENT DOCUMENTS

| | | | |
|---|---|---|---|
| 194931 | 3/1923 | United Kingdom . | |
| 232023 | 4/1925 | United Kingdom | 29/220 |
| 420823 | 12/1934 | United Kingdom . | |

*Primary Examiner*—James G. Smith
*Assistant Examiner*—Thomas W. Lynch
*Attorney, Agent, or Firm*—Richard C. Litman

[57] ABSTRACT

A valve spring compressor tool useful for removing valve springs from an overhead valve engine of the type having a threaded rocker arm stud adjacent the valve spring and a push rod aligned with the stud and the valve spring. The valve spring compressor tool of the present invention utilizes a crank down nut that has a socket portion for connection to a wrench and a neck portion which. passes through an oblong aperture in a compressor plate, where it is removably locked in position. The crank down nut has a threaded counterbore in its neck portion which threadably engages the rocker arm stud for descending and ascending the length of the stud as the crank down nut is rotated by a socket wrench connected to the socket portion. Axial movement of the crank down nut causes the compressor plate to pivot about its connection with the push rod for compression of the valve spring. A bifurcated end of the compressor plate contacts a retainer cap on the valve spring to compress the spring without interfering with the valve stem or a keeper on the valve stem, which allows for removal of the keeper while the spring remains compressed.

12 Claims, 3 Drawing Sheets

VALVE SPRING COMPRESSOR TOOL

This application is based upon the U.S. Provisional application Ser. No. 60/003,880 which was filed on Sep. 18, 1995.

BACKGROUND OF THE INVENTION

1. Field of the Invention

The present invention relates to auto repair tools, and more specifically to a tool for compressing valve springs. Even more specifically, the present invention relates to a valve spring compressor tool for use in connection with the valve springs of an overhead valve engine.

2. Description of the Prior Art

Internal combustion engines utilize a number of cylinders, each of which may have two valves (one valve for intake and the other for exhaust) or in some cases four valves (two for intake and two for exhaust). Regardless of the engine design, each valve is operated against pressure exerted by a spring that surrounds a corresponding valve stem. The spring typically is interposed between a valve guide within the cylinder head and a retainer cap or washer removably secured on the end of the valve stem by a retainer (often called a "keeper").

Due to the reciprocating motion of the valve assemblies, the valves and valve seals are subject to wear, and the valve springs are subject to fatigue which may cause a loss of compressive force and eventual fracture. Therefore, it may be necessary on occasion for an individual to have the valves, valve seals, or valve springs replaced in his or her automobile engine. Typically, such repairs only can be effected by removing the valve spring surrounding the valve stem. To remove the valve spring, the washer and keeper located on the end of the valve stem must first be removed. However, the washer and keeper cannot be removed until the valve spring is compressed, thereby releasing the tension applied against the washer and keeper.

The prior art contains numerous examples of valve spring compression tools which may be used to compress the valve spring to enable removal of the washer and keeper. U.S. Pat. No. 1,157,223, which issued to Lewis H. Holcomb on Oct. 19, 1915, discloses a valve lifter that comprises a pair of spring engageable elements and a pivotally attached handle that may be operated from various angles. U.S. Pat. No. 1,468,526, which issued to Joseph Terroine on Sep. 18, 1923, discloses a compression tool that utilizes a pair of telescoping elements for engaging opposite ends of the spring and a removable handle that effects a cam arrangement to reciprocate the telescoping elements for compression and decompression of the spring. These tools tend to be relatively complex and include a number of movable parts, which may result in increased wear and decreased longevity, as well as a greater likelihood of breakage under the stress of use. Furthermore, the above-described tools are designed for use on older L head engines wherein the valves and valve springs are mounted in the cylinder block.

United Kingdom Pat. No. 420,823, which issued to Reginald James Aspeek on Dec. 3, 1934, discloses a valve spring compressor utilizing a lever which has a lifting screw on one end for contacting a valve head and a lifting fork pivotally mounted on the other end. The lever is pivotally mounted to a beam which rests upon a portion of the engine, whereby manipulation of the lever results in parallel lifting of the fork and compression of the valve spring. This tool also tends to be relatively complex and include a number of movable parts, which may result in increased wear and decreased longevity, as well as a greater likelihood of breakage under the stress of use.

U.S. Pat. No. 5,339,515, which issued to Douglas C. Brackett and William H. Webster on Aug. 23, 1994, discloses several embodiments of apparatus for installing and removing valve spring retainer assemblies. In each of the embodiments, a mounting post is secured within a spark plug opening and a depressor is mounted over the spring retainer to force the spring retainer away from the valve lock when the spring is compressed. A magnetic wand is necessary to remove or install the valve lock when the spring is compressed, and a high pressure fluid source is coupled to the mounting post for delivering the fluid into the cylinder to prevent the valves from falling into the cylinders after the valve locks are removed. To accomplish the desired compression of the valve springs, an actuating arm pivots about its point of connection to the mounting post, which allows the arm to contact the depressor and cause compression of the valve spring. In another embodiment, rotation of a barrel threadably connected to the mounting post causes linear depression of an actuating mechanism designed to compress four valve springs at once. In another embodiment, rotation of a tapered barrel threadably connected to the mounting post causes pivoting of a pair of actuating arms at the mounting post, which compresses two valve springs at once. Each of the embodiments are designed for removal of the valve locks from deep pocket valves. In addition, in each embodiment where the actuating arm pivots to effect the depressor, the actuating arm pivots at the point of attachment to the mounting post. Furthermore, the embodiments of the Brackett et al. apparatus require use of several separate elements, such as the magnetic wand and the spring compression mechanisms.

United Kingdom Pat. No. 194,931, which issued to Hugh Gardner Hickman on Mar. 22, 1923, discloses a valve spring compressor for removing valve springs from overhead valves. The disclosed compressor utilizes a holder tool screwed into the spark plug hole for adjustably supporting a rod upon which a fulcrum piece is mounted for pivoted movement. A lever having an enlarged aperture for accommodating the valve stem engages the fulcrum piece so that manual movement of the lever, pivoting about the fulcrum point on the rod, compresses the valve spring to provide access to the locking device upon the valve spring cap.

U.S. Pat. No. 5,349,732, which issued to John O. Spence on Sep. 27, 1994, discloses a locking type plier for removing and installing valve springs from the valves of an overhead valve engine of the type having a stud adjacent the valve spring. The tool comprises a first jaw removably secured to one of the plier jaws, where the first jaw has an aperture therethrough for placement over the stud adjacent a valve spring; and a second jaw removably secured to the other of the plier jaws, where the second jaw has a large opening therethrough. After placing the first jaw over the stud, manipulation of the pliers causes the second jaw to engage the valve spring retainer cap, thereby compressing the valve spring while allowing the valve retainer to pass through the opening in the second jaw. While removably securing the first and second jaws to the locking type pliers allows the freedom to replace the jaws to accommodate use on a variety of engines, the necessity of unscrewing the first and second jaws and screwing replacement jaws into the locking pliers may be a time consuming task. While the above-described tool may be released to allow hands-free compression of the valve spring, the tool is limited to the extent that the tool requires the handle portion of the pliers to be linearly aligned with the stud and valve assembly. Thus, depending upon the location and position of the cylinder head it may be difficult to align the tool for use (i.e., in a truck or van engine).

U.S. Pat. No. 4,567,634, which issued to William H. Landry on Feb. 4, 1986, discloses a tool for compressing springs in the valve assemblies on an overhead valve engine of the type having a stud adjacent the valve spring. The tool comprises a bifurcated lever that is secured to the stud by a nut so that its bifurcated prongs are seated above a valve keeper, and a torque transmitting cylinder integrally connected to the opposite end of the bifurcated lever. A wrench or the like is used to apply torque to the cylinder such that the lever pivots about the stud nut and causes the prongs to force the valve spring retainer downward to compress the spring. This may cause damage to the threaded portion of the stud, which could effect the performance of the rocker arm that is mounted to the stud during normal engine operation. Furthermore, the above-described tool cannot be released between the compression of the spring and the removal of the keeper. In addition, the above-described tool never contacts the push rod.

Many conventional valve spring compressor tools require the user to use both hands when compressing the valve spring. Thus, it is often difficult for the user to maintain the valve spring in a compressed condition with the tool while simultaneously removing the keeper. Thus, there is a need for valve spring compressor tools which allows the user to compress the valve spring and retain the spring compressor without use of the hands. The prior art has addressed this need to some extent, however, there is still remains a need for a valve compressor tool which is easy to use and allows for maintaining compression of the valve spring for easy removal of the keeper.

None of the above inventions and patents, taken either singly or in combination, is seen to describe the instant invention as claimed.

SUMMARY OF THE INVENTION

A valve spring compressor tool for removing valve springs from an overhead valve engine of the type having a threaded rocker arm stud adjacent the valve spring and a push rod aligned with the stud and the valve spring. The valve spring compressor tool of the present invention utilizes a crank down nut that has a socket portion for connection to a socket wrench and a neck portion which passes through an oblong aperture formed in a compressor plate, where it is removably locked in position. The crank down nut has a threaded counterbore in its neck portion which threadably engages the rocker arm stud for descending and ascending the length of the stud as the crank down nut is rotated by a socket wrench connected to the socket portion. Axial movement of the crank down nut causes the compressor plate to pivot about its connection with the push rod for compression of the valve spring. One end of the compressor plate has a depression formed in its bottom side for receiving the top of the push rod, which forms a pivotal connection for movement of the compressor plate as well as maintains alignment of the compressor plate with respect to the valve spring. A bifurcated end of the compressor plate contacts a retainer cap on the valve spring to compress the spring without interfering with the valve stem or a keeper on the valve stem, which allows for removal of the keeper while the spring remains compressed.

Because the aperture in the compressor plate is oblong, the aperture allows the compressor plate to pivot about the connection between the depression and the push rod without interfering with the crank down nut as it axially descends and ascends the length of the rocker arm stud. Thus, rotational torque applied to the crank down nut in a clockwise direction causes the crank down nut axially to descend the stud by threaded engagement between the counterbore and the stud such that the downward axial movement of the crank down nut causes the compressor plate to pivot on the push rod and compress the spring. Similarly, rotational torque applied to the crank down nut in a counterclockwise direction causes upward axial movement of the crank down nut by threaded engagement between the counterbore and the stud such that the upward axial movement of the crank down nut causes the compressor plate to pivot on the push rod to allow decompression of the spring.

In addition, because the rocker arm studs of different overhead valve engines may vary in their threaded diameter, the diameter of the internally threaded counterbore may be varied according to the known size of rocker arm studs. Thus, a variety of crank down nuts may be provided in a kit to allow for use of the tool on any number of different engines.

Accordingly, it is a principal object of the invention to provide a valve spring compressor tool for removing valve springs from valve assemblies.

Another object of the invention is to provide a valve spring compressor tool that may be used to compress a valve spring and from which a users hands may be removed while the tool retains the valve spring in a compressed position.

It is another object of the invention to provide a valve spring compressor tool that may be used with any conventional socket wrench or air wrench to provide the necessary torque.

It is a further object of the invention to provide a valve spring compressor tool that comprises two removably connected parts, whereby the exchange of one part renders the tool adaptable for use on a wide variety of automobiles.

Still another object of the invention is to provide a valve spring compressor tool that utilizes few moving parts and therefore is not susceptible to breakage from wear caused by repeated use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
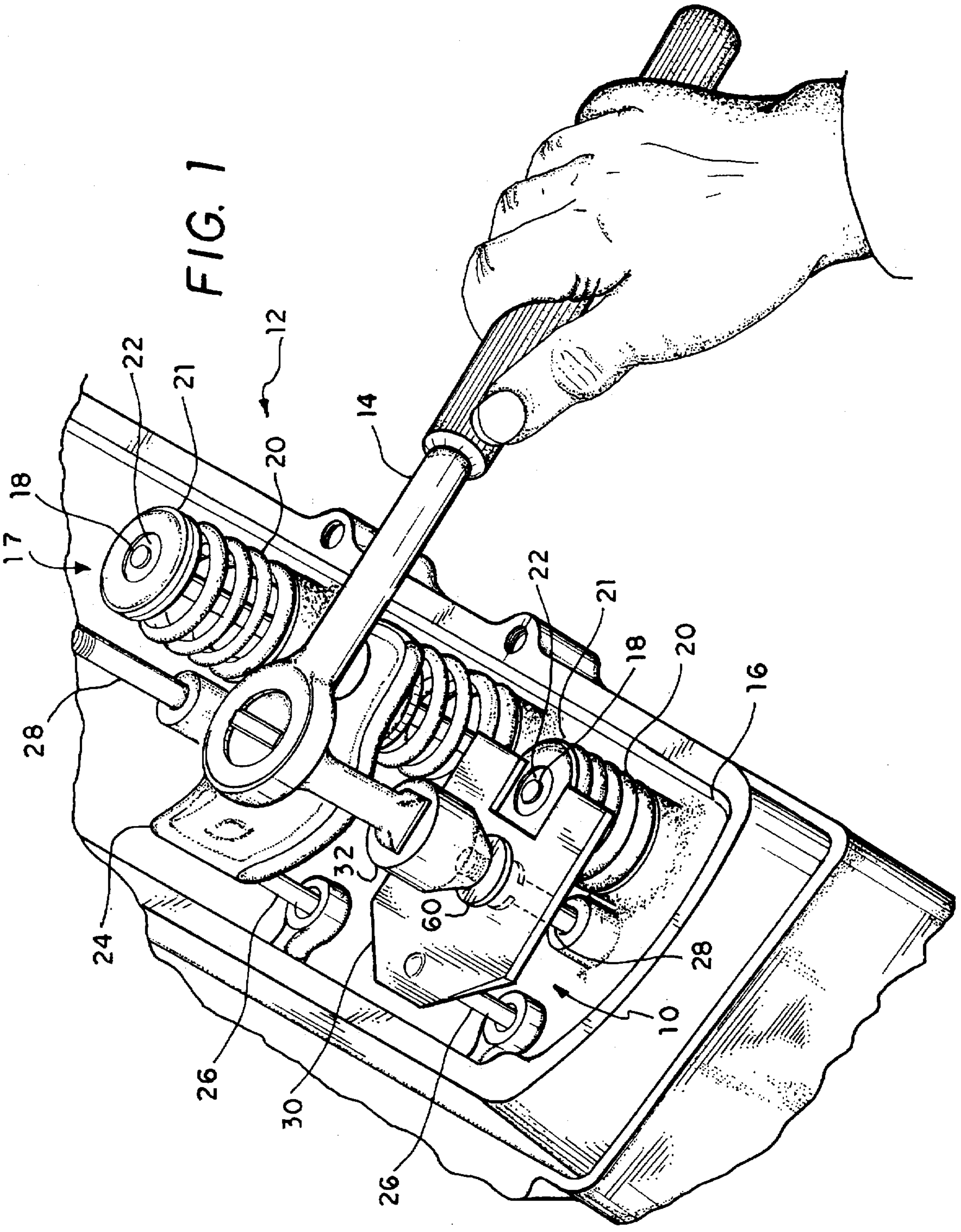
FIG. 1 is a environmental perspective view of the valve spring compression tool of the present invention as it is connected to the rocker arm stud for pivotal movement about the push rod to compress the valve spring.
Figure 3:
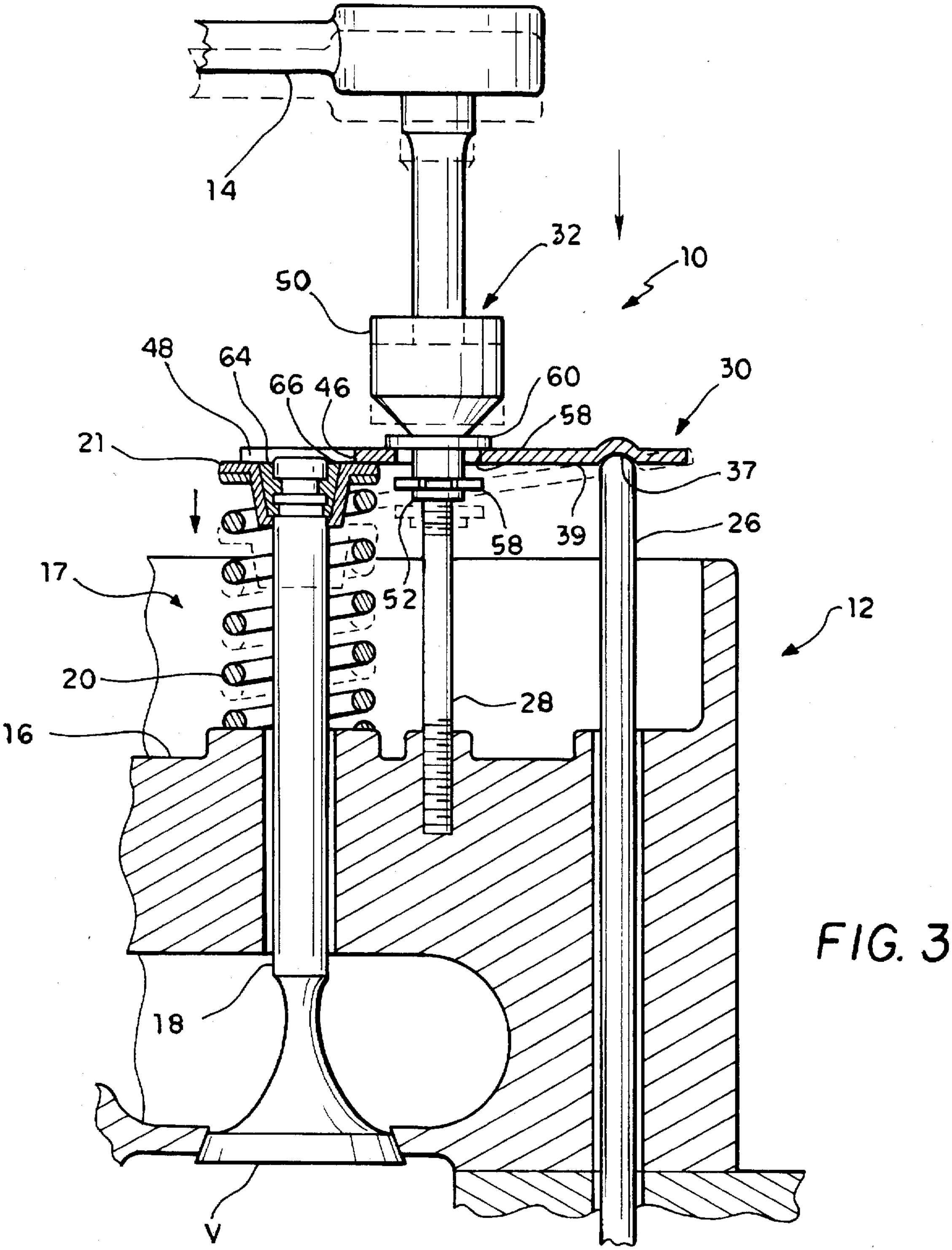
FIG. 3 is an elevational cross sectional view of the valve spring compression tool shown pivoting about the push rod to compress the spring as the crank down nut rotatably descends the threaded rocker arm stud.

Referring to the figures by numerals of reference, and first to FIG. 1, 10 denotes generally a valve spring compressor tool for compressing a valve spring surrounding of a valve assembly for an overhead valve engine and thereby facilitating removal of the valve spring from the valve assembly. FIG. 1 is an environmental perspective view of the valve spring compressor tool 10 in use with a ratcheted socket wrench 14 for removal of the valve spring from a valve assembly in an overhead valve engine 12. It should be noted that any type of socket wrench (i.e., a manual socket wrench or an air wrench) may be used in connection with the valve spring compressor tool. The overhead valve engine 12 comprises a cylinder head 16 having a number of valve assemblies 17 located in line, where each valve assembly is actuated through cam shafts (not shown) which act upon a push rod 26 to effect a rocker arm 24 pivotally mounted upon a rocker arm stud 28. Cyclical rotation of the cam shafts yields reciprocation of the rocker arm 24 to provide the timed compression and decompression of the valve assemblies for the opening and closing of the valves. Each valve assembly comprises a valve V (shown in FIG. 3) having a valve stem 18 with a valve spring 20 encompassing the stem. To maintain the spring about the valve stem, each valve assembly is provided with a washer or retainer cap 21 in which a retainer or "keeper" 22 is mounted upon the valve stem. The valve spring 20 urges the valve into a normally closed position which is illustrated in FIG. 3. Such cylinder heads are of conventional design and therefore need not be discussed in any greater detail.

Figure 2:
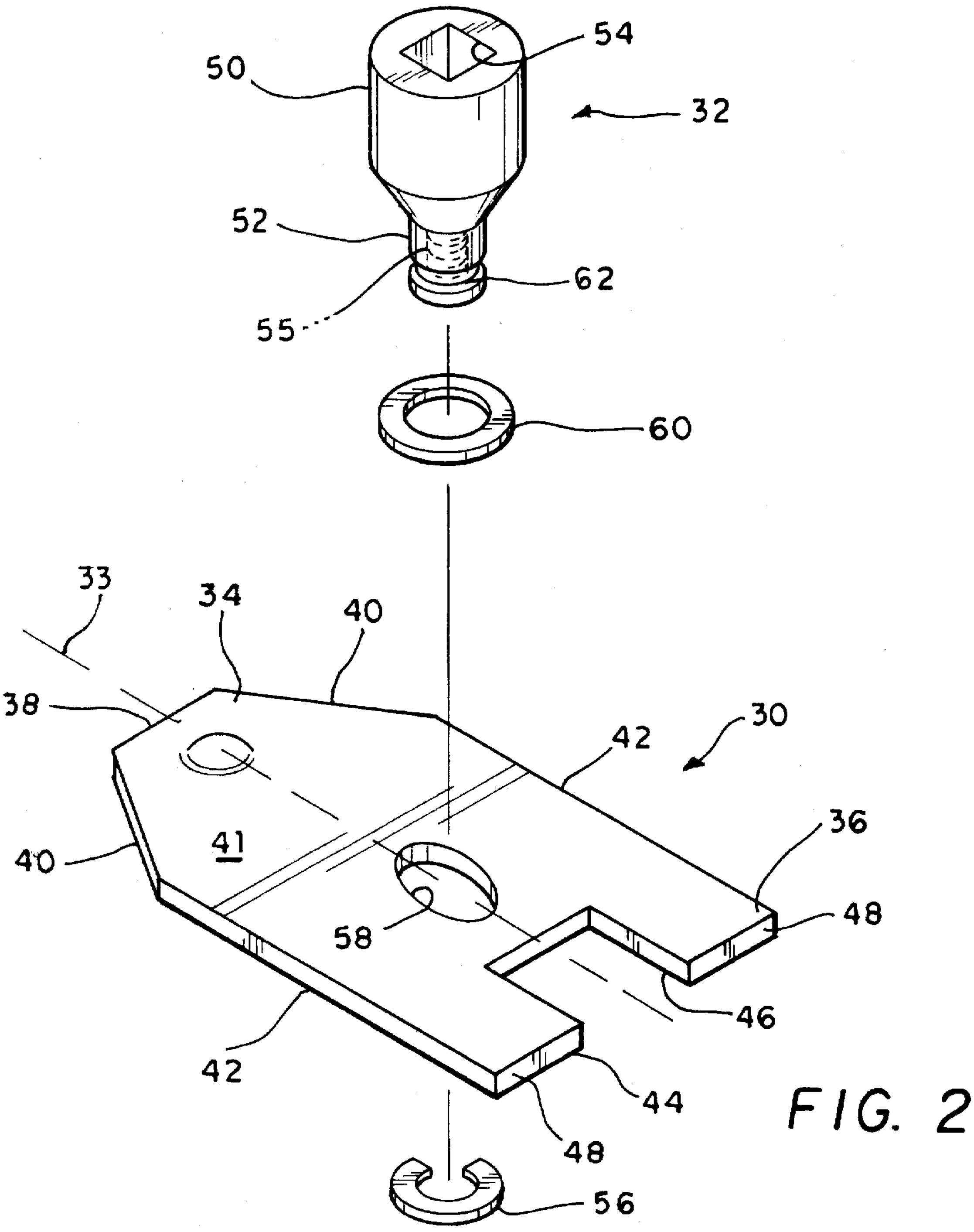
FIG. 2 is an exploded view of the valve spring compression tool of the present invention.

Referring specifically now to FIG. 2, which shows an exploded view of the valve spring compressor tool 10, the main components of the tool 10 comprise a steel compressor plate 30 and a steel crankdown nut 32. The compressor plate 30 is substantially flat and has an axis of symmetry 33 that extends in the direction between a tapered first end 34 and an opposed second end 36. The first end 34 has a front edge 38 and two angled edges 40 which symmetrically taper away from opposed side edges 42 of the compressor plate 30 toward the front edge 38. The first end 34 also contains push rod engaging means in the form of a dimple or depression 37 formed in a bottom surface 39 of the compressor plate, as shown at FIG. 3. From the exploded view shown at FIG. 2, however, the depression 37 appears as a resulting protrusion on a top surface 41 of the compressor plate. The depression 37 lies along the axis of symmetry 33 intermediate the angled edges 40 of the first end. While the depression as described was formed by punching the steel compressor plate 30, it should be apparent that the depression may also be formed in a mold used in the manufacturing process, in which case no protrusion on the top side would be apparent. Regardless of the manner in which the depression 37 is formed, the depression is disposed to receive the top of the push rod 26 when the valve spring compressor tool 10 is positioned for use, as discussed hereinafter.

The second end 36 has a rear edge 44 substantially parallel to the front edge 38 and a spring engaging portion formed into the rear edge. The spring engaging portion comprises a bifurcation of the second end, where a centrally located rectangular cut-out or recess 46 separates a pair of rectangular prongs 48 which project from either side thereof. The recess 46, which lies along the axis of symmetry, is sized to fit around the valve stem 18 and keeper 22 such that the two prongs 48 may contact opposite sides of the retainer cap 21. Thus, as described more fully hereinafter, the prongs 48 allow the spring engaging portion to compress the valve spring 20 without interfering with the valve stem 18 or keeper 22.

The compressor plate 30 also includes an aperture therethrough which is located along the axis of symmetry and substantially midway between the front edge 38 and the rear edge 44. The aperture 58 is disposed to receive a neck portion 52 of the crank down nut 32, as indicated by the exploded view of FIG. 2. As shown in FIG. 2, the aperture 58 is oblong in the direction of the axis of symmetry. The oblong shape of the aperture provides freedom of movement for the compressor plate to pivot about the top of the push rod 26 without interfering with the crank down nut 32 as it is rotated to descend or ascend the length of the rocker arm stud, as discussed hereinafter.

The crank-down nut 32 has a socket portion 50 and the neck portion 52. The socket portion 50 is cylindrical in shape and includes torque receiving means in the form of a square socket sized to receive the connector on the ratcheted socket wrench or any other suitable socket wrench. Preferably, the socket 54 is sized to receive a three-eighths inch connector, which is standard for most socket wrenches. If a larger crank down nut is used, however, then a half-inch socket 54 may also be employed. Regardless of its size, the socket 54 contains an internal indent: (not shown) for receiving the resilient ball detent used on most socket wrench connectors and extension rod connectors.

The socket portion 50 tapers to form the reduced diameter neck portion 52, which also is cylindrical in shape and coaxial with respect to the socket portion. The neck portion has an internally threaded cylindrical counterbore 55 that axially extends into the lower end of the neck portion. The internally threaded counterbore 55 is disposed for mating with corresponding threads on the rocker arm stud 28. It should be noted that the different car manufacturers utilize different sized rocker arm studs in their overhead valve engines. For example, General Motors utilizes a rocker arm stud having a threaded diameter of three-eighths inch, whereas Ford utilizes uses a stud having a threaded diameter of five-sixteenths inch. Thus, the crank down nut 32 may be provided with a neck portion having a counterbore 55 with any one of a number of various diameters, such as three-eighths inch or five-sixteenths inch. Furthermore, it should be apparent that more than one crank down nut will be required to adapt the tool 10 for use on more than one type of engine.

To facilitate the connecting of the crank down nut and the compressor plate, a washer 60 is provided for placement around the neck portion 52 to space apart the socket portion 50 and the compressor plate 30, and a C-clip 56 is provided for locking the neck portion 52 against removal through the aperture 58 of the compressor plate. The washer 60 preferably is formed from steel and has an inner diameter that is marginally larger than the outer diameter of the neck portion. The C-clip 56 engages an annular groove 62 formed about the circumference of the neck portion adjacent its lower end. Therefore, to assemble the spring valve compressor tool 10, as shown in FIG. 2, a user should place the washer 60 around the neck portion 52 of the crank down nut 32, then insert the neck portion through the aperture 58 of the compressor plate 30, and finally press C-clip 56 into the annular groove 62 of the neck portion. The connector on a wrench may be inserted into socket 54 to render the tool useful for its intended purpose.

Referring specifically now to FIGS. 1 and 3, use of the compressor tool 10 to remove valve springs is thoroughly explained below. In use, a user must first remove the rocker arm 24 to expose the rocker arm stud 28, the push rod 26, and the valve assembly 17. Before removing the spring, however, a user also should couple a pressurized air hose (not shown) to the spark plug receptacle of the cylinder head (not shown). It is well known in the industry that introduction of pressurized air into the cylinder of overhead valve engines prevents the valve from falling into the cylinder after the keeper is removed from the valve stem. With the rocker arm 24 removed, the valve spring compressor tool 10 is positioned by initially threading the counterbore 55 of the neck portion onto the rocker arm stud 28 until the compressor plate 30 loosely contacts the valve assembly 17 and the push rod 26. The compressor plate should then properly be aligned to allow the spring engaging portion of the compressor plate to compress the spring 20 without interfering with the valve stem 18 and subsequent removal of the keeper. The proper alignment of the compressor plate is with its depression receiving the top of the push rod and the prongs 48 contacting opposite sides of the retainer cap 21 on the valve assembly. The interaction between the depression 37 and the push rod 26, in addition to providing the pivot point upon which the compressor plate tilts, also maintains alignment of the compressor plate as the crank down nut 32 threadably descends or ascends the rocker arm stud.

Using the wrench 14 to provide rotational torque to the crank down nut 32, clockwise rotation of the crank down nut causes the crank down nut axially to descend the stud by threaded engagement between the counterbore of the neck portion and the threads on the stud. As the crank down nut 32 descends down the rocker arm stud, the crank down nut (acting through the washer 60) causes the compressor plate 30 to pivot at the connection between the depression 37 and the push rod 26. Pivoting of the compressor plate allows the prongs 48, contacting the retainer cap 21 on either side of the valve stem 18, to compress the valve spring 20 to the extent that the crank down nut has caused the compressor plate to pivot. As indicated in FIG. 3, continued clockwise rotation of the crank down nut 32 causes the compressor plate 30 to pivot, as indicated by the arrows, into the position represented by the ghost lines. The aperture 58, being of an oblong shape, allows: the compressor plate to pivot while moving upwardly and downwardly along the length of the rocker arm stud.

When the crank down nut has fully descended the rocker arm stud to pivot the compressor plate into the position represented by the ghost lines in FIG. 3, a user may remove the keeper 22 to free the valve spring. Keeper 22 includes two tapered half-cylinder elements 64 and 66, each of which includes circumferentially grooved inner surfaces for engaging the circumferentially ribbed upper end of the valve stem 18. Normally the valve spring 20 acts to force the retainer cap 21 to urge the elements 64 and 66 into engagement with the valve stem, as indicated above. Thus, the keeper 22 normally prevents removal of the retainer cap 21. However, when the spring is compressed, as represented by the ghost lines in FIG. 3, retainer cap 21 disengages from the keeper elements 64 and 66 to allow their removal from the valve stem. With the crank down nut 32 holding the compressor plate in its pivoted position, the user may utilize both hands to remove the keeper elements.

Following removal of the keeper, the wrench is rotated in the opposite direction to cause the crank down nut axially to ascend the stud by threaded engagement between the counterbore of the neck portion and the threads on the stud. As the crank down nut 32 ascends the rocker arm stud, the crank down nut (acting through the washer 60) allows the valve spring to pivot the compressor plate 30 at the connection between the depression 37 and the push rod 26. When the prongs 48 of the compressor plate are only loosely contacting the retainer cap (and the depression only loosely receiving the push rod), the compressor plate may be rotated 90°, for instance, to allow the retainer cap and valve spring to be removed from the valve stem. The pressurized gas inside the cylinder prevents the valve from falling into the cylinder, therefore, the spring or valve seals may be replaced. If the valve V needs to be replaced, then the above steps should be accompanied by the removal of the cylinder head to provide access to the cylinder, in which case no pressurized air source is necessary.

Following replacement of the intended parts (i.e., valve springs, valve seals, etc.), the above steps may be repeated by compressing the valve spring to allow the keeper to be reattached to the valve stem. After replacing the keeper elements 64 and 66, the crank down nut may be completely removed from the rocker arm stud to allow the valve spring to return to its normally expanded position whereby the valve remains closed. With all of the necessary valve assemblies repaired, the rocker arms 24 may be replaced onto the rocker arm studs 28 and the engine otherwise returned to its normal condition.

One skilled in the art will appreciate that the present invention facilitates removal of the valve springs 20 by permitting the user to depress the valve spring 20 using a tool adapted for use on a variety of overhead valve engines. Furthermore, because the user may simply release the tool once the valve spring is compressed, the user may utilize both hands, if necessary, to remove the valve spring keeper 22.

It is to be understood that the present invention is not limited to the embodiment described above, but encompasses any and all embodiments within the scope of the following claims.

I claim:

1. A valve spring compressor tool for removing valve springs from an overhead valve engine of the type having a threaded rocker arm stud adjacent the valve spring and a push rod aligned with the rocker arm stud and the valve spring, the tool comprising:

a compressor plate having a first end with push rod engaging means and a second end with a spring engaging portion, and an aperture intermediate said first and second ends for receiving the rocker arm stud;

a crank down nut having a socket portion and a coaxial, reduced diameter neck portion, said socket portion having torque receiving means for receiving rotational torque applied to said crank down nut, and said neck portion having an internally threaded cylindrical counterbore axially extending into said neck portion to receive the rocker arm stud;

connecting means for connecting said crank down nut to said compressor plate;

torquing means for applying rotational torque to said crank down nut; and whereby the rotational torque applied to said crank down nut in one direction causes said crank down nut axially to descend the rocker arm stud by threaded engagement between said counterbore and the rocker arm stud such that the downward axial movement of said crank down nut causes said compressor plate to pivot on the push rod and compress the spring.

2. The valve spring compressor tool according to claim 1, whereby the rotational torque applied to said crank down nut in the opposite direction causes upward axial movement of said crank down nut by threaded engagement between said counterbore and the rocker arm stud such that the upward axial movement of said crank down nut causes said compressor plate to pivot on the push rod to allow decompression of the spring.

3. The valve spring compressor tool according to claim 1, wherein said push rod engaging means comprises a depression formed in a bottom side of said compressor plate for receiving the top of said push rod.

4. The valve spring compressor tool according to claim 1, wherein said compressor plate has an axis of symmetry extending in the direction between said first end and said second end, and said aperture is formed along said axis of symmetry.

5. The valve spring compressor tool according to claim 4, wherein said aperture is oblong in the direction of said axis of symmetry.

6. The valve spring compressor tool according to claim 1, wherein said spring engaging portion comprises a bifurcation of said second end, whereby a recess separates a pair of prongs, said prongs contacting a retainer cap on the valve spring.

7. The valve spring compressor tool according to claim 1, wherein said torquing means comprises a hand held ratchet wrench having a three-eighths inch connector.

8. The valve spring compressor tool according to claim 1, wherein said cylindrical counterbore of said crank down nut has a diameter of three-eighths of an inch.

9. The valve spring compressor tool according to claim 1, wherein said cylindrical counterbore of said crank down nut has a diameter of five-sixteenths of an inch.

10. The valve spring compressor tool according to claim 1, wherein said neck portion of said crank down nut is fitted into said aperture, said connecting means comprises:

a spacing element encircling said neck portion and interposed between said socket portion and said compressor plate; and locking means for locking said neck portion against removal through said aperture.

11. The valve spring compressor tool according to claim 10, wherein said locking means comprises:

an annular groove formed about the circumference of said neck portion; and a C-clip removably placed into said annular groove, said C-clip preventing said neck portion from passing through said aperture while said C-clip remains in said annular groove.

12. A valve spring compressor tool kit for removing valve springs from an overhead valve engine of the type having a threaded rocker arm stud adjacent the valve spring and a push rod aligned with the rocker arm stud and the valve spring, the tool kit comprising:

a compressor plate having a first end with push rod engaging means and a second end with a spring engaging portion, and an aperture intermediate said first and second ends for receiving the rocker arm stud;

a first crank down nut having a socket portion and a coaxial, reduced diameter neck portion, said socket portion having torque receiving means for receiving rotational torque applied to said first crank down nut, and said neck portion having an internally threaded cylindrical counterbore axially extending into said neck portion to receive the rocker arm stud;

a second crank down nut having a socket portion and a coaxial, reduced diameter neck portion, said socket portion having torque receiving means for receiving rotational torque applied to said second crank down nut, and said neck portion having an internally threaded cylindrical counterbore axially extending into said neck portion to receive the rocker arm stud;

wherein said internally threaded counterbore of said first crank down nut has a first diameter and said internally threaded counterbore of said second crank down nut has a second diameter, and said first diameter is different from said second diameter;

connecting means for connecting one of said crank down nuts to said compressor plate;

torquing means for applying rotational torque to one of said crank down nuts; and whereby the rotational torque applied to one of said crank down nuts in one direction causes said one crank down nut axially to descend the rocker arm stud by threaded engagement between said counterbore thereof and the rocker arm stud such that the downward axial movement of said one crank down nut causes said compressor plate to pivot on said push rod and compress the spring.

* * * * *